(12) United States Patent
Furuta

(10) Patent No.: US 11,938,779 B2
(45) Date of Patent: Mar. 26, 2024

(54) BEHAVIOR CONTROL DEVICE FOR VEHICLE

(71) Applicant: TOYOTA JIDOSHA KABUSHIKI KAISHA, Toyota Aichi-ken (JP)

(72) Inventor: Hiroki Furuta, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/950,602

(22) Filed: Sep. 22, 2022

(65) Prior Publication Data
US 2023/0097516 A1 Mar. 30, 2023

(30) Foreign Application Priority Data

Sep. 27, 2021 (JP) .................. 2021-156937

(51) Int. Cl.
*B60G 21/055* (2006.01)
*B60W 10/22* (2006.01)
(Continued)

(52) U.S. Cl.
CPC ......... *B60G 21/0555* (2013.01); *B60W 10/22* (2013.01); *B60W 30/025* (2013.01);
(Continued)

(58) Field of Classification Search
CPC ........ B60G 21/0555; B60G 2400/0511; B60G 2400/0512; B60G 17/02; B60G 2202/413; B60G 2202/42; B60G 2202/44; B60G 2600/182; B60G 2600/1874; B60G 2800/01; B60G 2800/9123; B60G 2800/915; B60W 10/22; B60W 30/025; B60W 40/112; B60W 40/11; B60W 2520/16; B60W 2520/18; B60W 2710/22
See application file for complete search history.

(56) References Cited

U.S. PATENT DOCUMENTS

2010/0204885 A1\* 8/2010 Kajino ............... B60G 21/0555
701/37
2010/0318262 A1 12/2010 Mizuta
(Continued)

FOREIGN PATENT DOCUMENTS

| JP | 2008-137446 A | 6/2008 |
| JP | 2009-073239 A | 4/2009 |
| JP | 2013-126821 A | 6/2013 |

*Primary Examiner* — Tyler J Lee
*Assistant Examiner* — Yufeng Zhang
(74) *Attorney, Agent, or Firm* — Dinsmore & Shohl LLP

(57) ABSTRACT

A behavior control device for a vehicle includes: a first actuator configured to apply a vertical control force to a left wheel on a first axle, the first axle being a front axle or a rear axle of the vehicle; a second actuator configured to operate independently of the first actuator and to apply a vertical control force to a right wheel on the first axle; and a controller. The controller is configured to calculate a required value of a behavior parameter representing a behavior of the vehicle, convert the required value of the behavior parameter to a first required force for the first actuator and a second required force for the second actuator, and control the first actuator such that the vertical control force applied to the left wheel on the first axle becomes the first required force.

1 Claim, 10 Drawing Sheets

(51) Int. Cl.
*B60W 30/02* (2012.01)
*B60W 40/11* (2012.01)
*B60W 40/112* (2012.01)

(52) U.S. Cl.
CPC ........... *B60W 40/11* (2013.01); *B60W 40/112* (2013.01); *B60G 2400/0511* (2013.01); *B60G 2400/0512* (2013.01); *B60W 2520/16* (2013.01); *B60W 2520/18* (2013.01); *B60W 2710/22* (2013.01)

(56) References Cited

U.S. PATENT DOCUMENTS

2016/0339923 A1* 11/2016 Koumura ............... B60G 17/06
2019/0185006 A1* 6/2019 Dhaens ........... B60W 30/18181

* cited by examiner

BEHAVIOR CONTROL DEVICE FOR VEHICLE

CROSS-REFERENCE TO RELATED APPLICATION

This application claims priority to Japanese Patent Application No. 2021-156937 filed on Sep. 27, 2021, incorporated herein by reference in its entirety.

BACKGROUND

1. Technical Field

The present disclosure relates to behavior control devices for vehicles.

2. Description of Related Art

A technique related to a behavior control device for a vehicle is described in, for example, Japanese Unexamined Patent Application Publication No. 2009-073239 (JP 2009-073239 A). A suspension control device according to the technique described in JP 2009-073239 A is a control device for so-called active suspensions. According to the technique, all four wheels of a vehicle are provided with an active suspension, and vertical control forces can be independently applied to each wheel by actuators. According to the technique, the actuators provided for each wheel are driven and controlled according to a predetermined control rule to control the heave, roll, and pitch of the vehicle so as to improve both the ride comfort and road holding.

SUMMARY

In the above technique, the heave, roll, and pitch of the vehicle are controlled using the four actuators. As a matter of course, mounting a larger number of actuators on a vehicle increases the degrees of freedom related to behavior control of the vehicle. However, the larger the number of actuators, the more complicated the system of the vehicle and the higher the cost per vehicle. If the degrees of freedom of the controllable behavior of the vehicle is the same, it is better to mount as few actuators as possible on the vehicle.

The present disclosure provides a technique that makes it possible to control the behavior of a vehicle with a small number of actuators.

A first aspect of the present disclosure is a behavior control device for a vehicle. The behavior control device includes: a first actuator configured to apply a vertical control force to a left wheel on a first axle, the first axle being a front axle or a rear axle of the vehicle; a second actuator configured to operate independently of the first actuator and to apply a vertical control force to a right wheel on the first axle; and a controller. The controller is configured to calculate a required value of a behavior parameter representing a behavior of the vehicle, convert the required value of the behavior parameter to a first required force for the first actuator and a second required force for the second actuator, control the first actuator such that the vertical control force applied to the left wheel on the first axle becomes the first required force, and control the second actuator such that the vertical control force applied to the right wheel on the first axle becomes the second required force.

According to the first aspect, a desired behavior of the vehicle can be implemented by controlling the second actuator based on the first required force converted from the required value of the behavior parameter, and controlling the second actuator based on the second required force converted from the required value of the behavior parameter. That is, the behavior of the vehicle can be controlled with a small number of actuators.

In the first aspect, the controller may be configured to calculate a required roll moment and a required in-phase vertical force (required first axle in-phase force) as the required value of the behavior parameter, the required roll moment being a moment to be applied to a center of gravity of the vehicle, and the required in-phase vertical force being a force to be applied to the right wheel and the left wheel on the first axle.

According to the above configuration, the required roll moment and the required first axle in-phase force can be achieved by the vertical control force applied to the left wheel on the first axle by the first actuator and the vertical control force applied to the right wheel on the first axle by the second actuator.

In the first aspect, the behavior control device may further include an active stabilizer configured to apply a vertical control force in antiphase to a right wheel and a left wheel on a second axle, the second axle being the front axle or the rear axle. The controller may be configured to calculate a required roll moment and a required in-phase vertical force (required first axle in-phase force) as the required value of the behavior parameter, the required roll moment being a moment to be applied to a center of gravity of the vehicle, and the required in-phase vertical force being a force to be applied to the right wheel and the left wheel on the first axle. The controller may be configured to convert the required value of the behavior parameter to the first required force for the first actuator, the second required force for the second actuator, and a required moment for the active stabilizer. The controller may be configured to control the first actuator such that the vertical control force applied to the left wheel on the first axle becomes the first required force. The controller may be configured to control the second actuator such that the vertical control force applied to the right wheel on the first axle becomes the second required force. The controller may be configured to control the active stabilizer such that the required moment is generated by the vertical control force applied in antiphase to the right and left wheels on the second axle.

According to the above configuration, the behavior of the vehicle can be controlled by the vertical control force applied to the left wheel on the first axle by the first actuator, the vertical control force applied to the right wheel of the first axle by the second actuator, and the anti-phase control force applied to the right and left wheels on the second axle by the active stabilizer. The second actuator is controlled based on the first required force converted from the required value of the behavior parameter, the second actuator is controlled based on the second required force converted from the required value of the behavior parameter, and the active stabilizer is controlled based on the required moment converted from the required value of the behavior parameter. The required roll moment and the required first axle in-phase force can thus be achieved, and the desired behavior of the vehicle can be implemented.

In the first aspect, the behavior control device may further include a third actuator configured to operate independently of the first actuator and the second actuator, and to apply a vertical control force to one of wheels on a second axle. The second axle may be the front axle or the rear axle. The controller may be configured to calculate a required roll moment, a required pitch moment, and a required heave force as the required value of the behavior parameter, each of the required roll moment, the required pitch moment, and the required heave force being a moment or force to be applied to a center of gravity of the vehicle. The controller may be configured to convert the required value of the behavior parameter to the first required force, the second required force, and a third required force for the third actuator. The controller may be configured to control the first actuator such that the vertical control force applied to the left wheel on the first axle becomes the first required force. The controller may be configured to control the second actuator such that the vertical control force applied to the right wheel on the first axle becomes the second required force. The controller may be configured to control the third actuator such that the vertical control force applied to the one of the wheels on the second axle becomes the third required force.

In the first aspect, the first actuator and the second actuator may be actuators of the same type, and the third actuator may be an actuator of the same type as the first actuator and the second actuator. The first actuator and the second actuator may be actuators of the same type, and the third actuator may be an actuator of a different type from the first actuator and the second actuator. The controller may be configured to calculate a required roll moment, a required pitch moment, and a required heave force as the required value of the behavior parameter, each of the required roll moment, the required pitch moment, and the required heave force being a moment or force to be applied to a center of gravity of the vehicle.

According to the above configuration, the behavior of the vehicle can be controlled by the vertical control force applied to the left wheel on the first axle by the first actuator, the vertical control force applied to the right wheel of the first axle by the second actuator, and the vertical control force applied to the one of the wheels on the second axle by the third actuator. The second actuator is controlled based on the first required force converted from the required value of the behavior parameter, the second actuator is controlled based on the second required force converted from the required value of the behavior parameter, and the third actuator is controlled based on the third required force converted from the required value of the behavior parameter. The required roll moment, the required pitch moment, and the required heave force can thus be achieved, and the desired behavior of the vehicle can be implemented.

According to the first aspect of the present disclosure, the behavior of the vehicle can be controlled with a small number of actuators.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. When numerical values such as number, quantity, amount, range, etc. are mentioned regarding an element in the following embodiments, the idea according to the present disclosure is not limited to the mentioned numerical values unless otherwise specified or unless clearly limited to the mentioned numerical values in principle. The structures etc. described in the following embodiments are not necessary to the idea according to the present disclosure unless otherwise specified.

1. First Embodiment 1-1. Behavior Control for Vehicle

Figure 1:
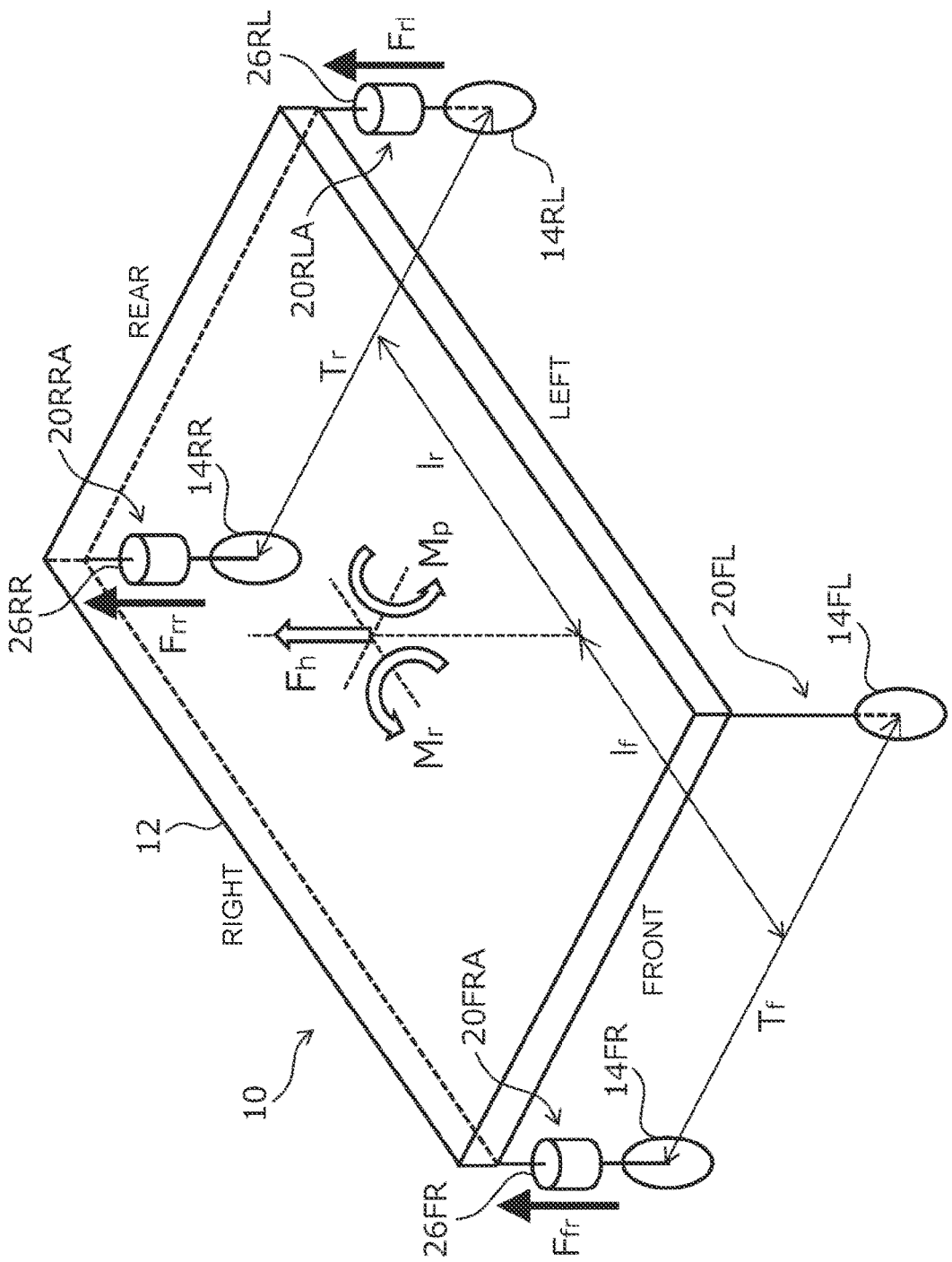
FIG. 1 shows a behavior model of a vehicle illustrating behavior control for a vehicle according to a first embodiment of the present disclosure.

Behavior control according to a first embodiment will be described with reference to FIG. 1. FIG. 1 shows a behavior model of a vehicle illustrating the behavior control according to the first embodiment. Behavior parameters to be controlled in the first embodiment and operation parameters for controlling the behavior parameters are shown in the behavior model of FIG. 1.

In the behavior model of a vehicle 10 shown in FIG. 1, suspensions 20RRA, 20RLA that suspend right and left wheels 14RR, 14RL on a rear axle (first axle), respectively, are configured as active suspensions. A suspension 20FRA that suspends a right wheel 14FR on a front axle (second axle) is also configured as an active suspension. Specifically, the suspension 20FRA, 20RRA, and 20RLA are so-called fully active suspensions that can actively apply a vertical control force between the wheels 14FR, 14RR, and 14RL and a vehicle body 12 by actuators 26FR, 26RR, and 26RL, respectively. A suspension 20FL that suspends a left wheel 14FL on the front axle is a commonly used suspension with no actuator, that is, a non-active suspension.

In the behavior control according to the first embodiment, a control force $F_{rl}$ that is applied to the left rear wheel 14RL by the actuator (first actuator) 26RL is used as an operation parameter. A control force $F_{rr}$ that is applied to the right rear wheel 14RR by the actuator (second actuator) 26RR is also used as an operation parameter. A control force $F_{fr}$ that is applied to the right front wheel 14FR by the actuator (third actuator) 26FR is also used as an operation parameter.

In the behavior model of the vehicle 10 shown in FIG. 1, modes of motion at the position of the sprung center of gravity of the vehicle 10, that is, a roll moment $M_r$, a pitch moment $M_p$, and a heave force $F_h$, are behavior parameters. When three of the four wheels are equipped with an actuator, all of the roll, pitch, and heave of the vehicle 10 can be controlled by using the control forces of the actuators as operating parameters. Therefore, in the behavior control according to the first embodiment, the control forces $F_{rl}$, $F_{rr}$, and $F_{fr}$ as operation parameters are determined so that the required values of the behavior parameters, that is, a required roll moment $M_r$, a required pitch moment $M_p$, and a required heave force $F_h$, are achieved.

Various controls related to the behavior of the vehicle 10 are performed in the vehicle 10. For example, sprung feedback control that reduces vibration of a sprung member is performed based on the sprung state quantity calculated using a measured value from a sprung acceleration sensor. Unsprung feedback control that reduces vibration of an unsprung member is performed based on the unsprung state quantity calculated using measured values from the sprung acceleration sensor and a vehicle height sensor. There are also cases where preview control for previewing the road surface condition using camera images and a database of high-precision map data or attitude control for controlling the attitude with respect to steering and acceleration and deceleration is performed. It should be understood that these various controls may be performed in combination. In these controls, various forces and moments are required according to the purpose of the control.

However, no matter what force and moment are required, the required force and required moment can be converted to the modes of motion at the position of the sprung center of gravity of the vehicle 10. In the present specification, the modes of motion composed of the roll moment, the pitch moment, and the heave force are referred to as three center-of-gravity modes. Conversion expressions for converting various required forces and required moments to the three center-of-gravity modes will be described.

First, parameters used the conversion expressions are defined as follows.

$l_f$: Distance between the centers of gravity of the vehicle and the front axle (see FIG. 1)

$l_r$: Distance between the centers of gravity of the vehicle and the rear axle (see FIG. 1)

$T_f$: Front track (see FIG. 1)

$T_r$: Rear track (see FIG. 1)

$F_h$: Total required heave force $M_r$: Total required roll moment $M_p$: Total required pitch moment $F_{fli}$: Required vertical force for the left front wheel $F_{fri}$: Required vertical force for the right front wheel $F_{rli}$: Required vertical force for the left rear wheel $F_{rri}$: Required vertical force for the right rear wheel (Each of the above required forces includes a required force by feedforward control and a required force by feedback control.)

$F_{fin}$: Total required force in the same direction to be applied to the right and left wheels on the front axle (required front axle in-phase force)

$F_{fan}$: Total required force in the opposite directions to be applied to the right and left wheels on the front axle (required front axle antiphase force)

$F_{rin}$: Total required force in the same direction to be applied to the right and left wheels on the rear axle (required rear axle in-phase force)

$F_{ran}$: Total required force in the opposite directions to be applied to the right and left wheels on the rear axle (required rear axle antiphase force) (Each of the above required in-phase and antiphase forces includes a required force by feedforward control and a required force by feedback control.)

$F_{hm}$: Required heave force in mode control including ride comfort control and attitude control $M_{rm}$: Required roll moment in mode control including ride comfort control and attitude control $M_{pm}$: Required pitch moment in mode control including ride comfort control and attitude control The required vertical forces for each wheel can be converted into the three center-of-gravity modes by the following expression 1.

Expression 1

$$\begin{bmatrix} F_{hi} \\ M_{ri} \\ M_{pi} \end{bmatrix} = \begin{bmatrix} 1 & 1 & 1 & 1 \\ \dfrac{-T_f}{2} & \dfrac{T_f}{2} & \dfrac{-T_r}{2} & \dfrac{T_r}{2} \\ -l_f & -l_f & l_r & l_r \end{bmatrix} \begin{bmatrix} F_{fri} \\ F_{fli} \\ F_{rri} \\ F_{rli} \end{bmatrix} \quad \cdots \text{式}1$$

The required in-phase and antiphase forces for each axle can be converted into the three center-of-gravity modes by the following expression 2.

Expression 2

$$\begin{bmatrix} F_{ha} \\ M_{ra} \\ M_{pa} \end{bmatrix} = \begin{bmatrix} 1 & 0 & 1 & 0 \\ 0 & \dfrac{T_f}{2} & 0 & \dfrac{T_r}{2} \\ -l_f & 0 & l_r & 0 \end{bmatrix} \begin{bmatrix} F_{fin} \\ F_{fan} \\ F_{rin} \\ F_{ran} \end{bmatrix} \quad \cdots \text{式}2$$

The values of the three center-of-gravity modes calculated by expression 1, the values of the three center-of-gravity modes calculated by expression 2, and the required values of the three center-of-gravity modes of the mode control are added together as given by the following expression 3. The total required values of the three center-of-gravity modes, that is, the total required heave force $F_h$, the total required roll moment $M_r$, and the total required pitch moment $M_p$, are thus calculated.

Expression 3

$$\begin{bmatrix} F_h \\ M_r \\ M_p \end{bmatrix} = \begin{bmatrix} F_{hm} + F_{hi} + F_{ha} \\ M_{rm} + M_{ri} + M_{ra} \\ M_{pm} + M_{pi} + M_{pa} \end{bmatrix} \quad \cdots \text{式}3$$

No matter what control related to the behavior of the vehicle 10 is performed, the required values of the behavior parameters representing the behavior of the vehicle 10 can be represented by the required values of the three center-of-gravity modes by the conversions using the above expressions 1, 2, and 3. Once the required values of the three center-of-gravity modes are determined, the required forces for the actuators 26FR, 26RR, and 26RL can be obtained from the required values of the three center-of-gravity modes by the conversion given by the following expression 4.

Expression 4

$$\begin{bmatrix} F_{fr} \\ M_{rr} \\ M_{rl} \end{bmatrix} = \begin{bmatrix} 1 & 1 & 1 \\ \dfrac{-T_f}{2} & \dfrac{-T_r}{2} & \dfrac{T_r}{2} \\ -l_f & l_r & l_r \end{bmatrix}^{-1} \begin{bmatrix} F_h \\ M_r \\ M_p \end{bmatrix} \quad \cdots \text{式}4$$

In the behavior control according to the first embodiment, the actuator 26RL is controlled so that the vertical control force applied to the left rear wheel 14RL becomes the required force (first required force) $F_{rl}$, and at the same time, the actuator 26RR is controlled so that the vertical control force applied to the right rear wheel 14RR becomes the required force (second required force) $F_{rr}$. At the same time, the actuator 26FR is also controlled so that the vertical control force applied to the right front wheel 14FR becomes the required force (third required force) $F_{fr}$. By thus controlling the actuators 26FR, 26RR, and 26RL based on the required forces converted from the required values of the three center-of-gravity modes, a desired behavior including all of the roll, pitch, and heave is implemented in the vehicle 10.

1-2. Behavior Control Device for Vehicle

Figure 2:
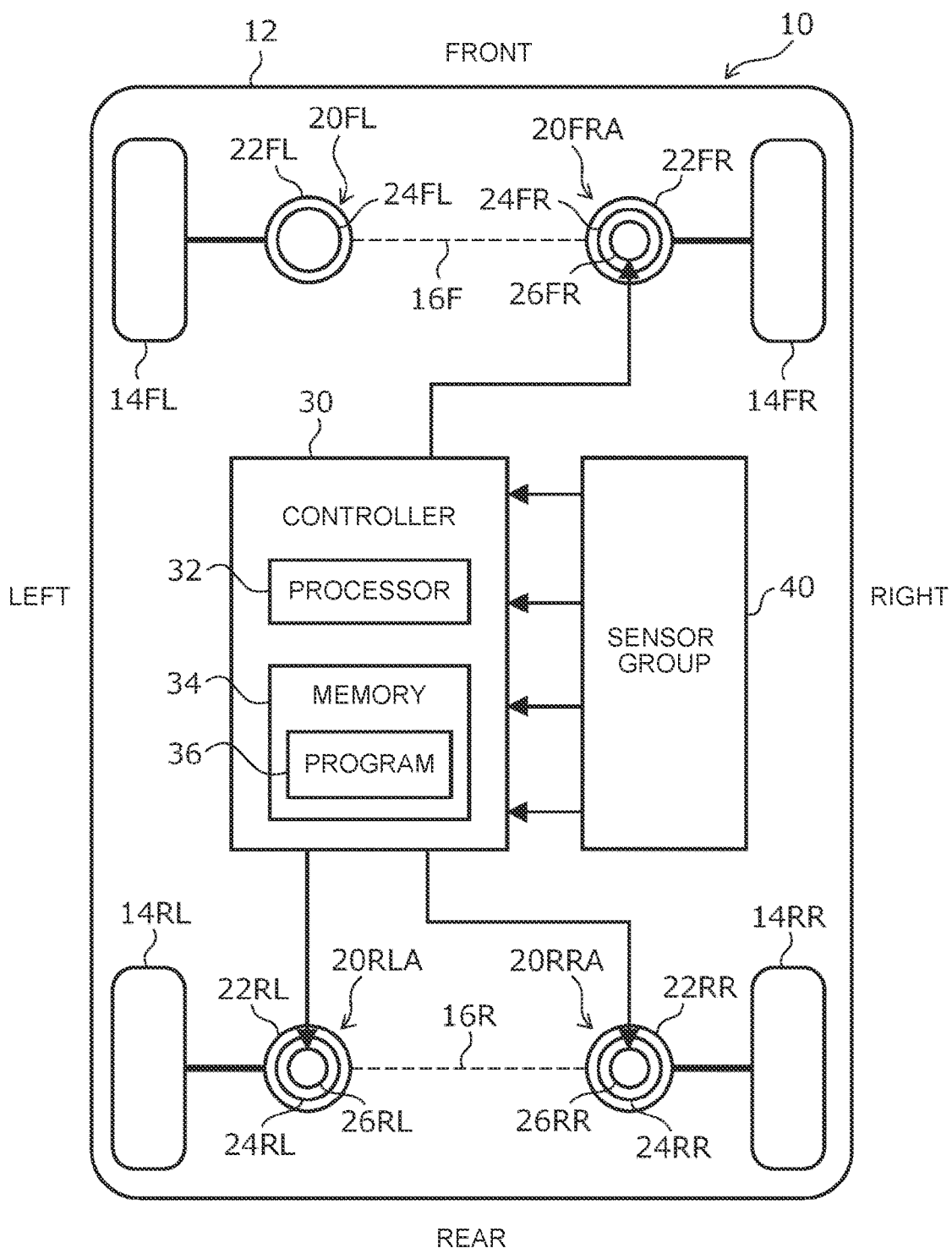
FIG. 2 shows a configuration of a vehicle equipped with a behavior control device for a vehicle according to the first embodiment of the present disclosure.

Next, a behavior control device for performing the above behavior control will be described with reference to FIG. 2. FIG. 2 shows a configuration of the vehicle 10 equipped with a behavior control device for a vehicle according to the first embodiment.

As shown in FIG. 2, the vehicle 10 includes the right front wheel 14FR and the left front wheel 14FL on a front axle 16F, and includes the right rear wheel 14RR and the left rear wheel 14RL on a rear axle 16R. The right and left front wheels 14FR, 14FL are steering wheels, and the right and left rear wheels 14RR, 14RL are non-steering wheels. However, the rear wheels 14RR, 14RL may also be provided with a steering mechanism. The vehicle 10 may be a front-wheel drive vehicle that drives the front wheels 14FR, 14FL, may be a rear-wheel drive vehicle that drives the rear wheels 14RR, 14RL, or may be an all-wheel drive vehicle that drives the front wheels 14FR, 14FL and the rear wheels 14RR, 14RL.

The vehicle 10 further includes the suspension 20FL that suspends the left front wheel 14FL from the vehicle body 12, the suspension 20FRA that suspends the right front wheel 14FR from the vehicle body 12, the suspension 20RLA that suspends the left rear wheel 14RL from the vehicle body 12, and the suspension 20RRA that suspends the right rear wheel 14RR from the vehicle body 12. As described above, the right suspension 20FRA on the front axle 16F and the right and left suspensions 20RRA, 20RLA on the rear axle 16R are active suspensions (fully active suspensions), and only the left suspension 20FL on the front axle 16F is a non-active suspension.

The left suspension 20FL on the front axle 16F that is a non-active suspension includes a spring 22FL and a shock absorber 24FL. The right suspension 20FRA on the front axle 16F that is an active suspension includes the actuator 26FR in addition to a spring 22FR and a shock absorber 24FR. The actuator 26FR is disposed between the vehicle body 12 and a piston rod of the shock absorber 24FR. The actuator 26FR is configured to hydraulically or electromagnetically generate a vertical control force between the vehicle body 12 and the right front wheel 14FR.

The suspensions 20RRA, 20RLA on the rear axle 16R that are active suspensions also include the actuators 26RR, 26RL in addition to springs 22RR, 22RL and shock absorbers 24RR, 24RL, respectively. The actuators 26RR, 26RL are disposed between the vehicle body 12 and piston rods of the shock absorbers 24RR, 24RL, respectively. The actuators 26RR, 26RL have the same configuration as the actuator 26FR, and generate a vertical control force between the vehicle body 12 and the right and left wheels 14RR, 14RL on the rear axle 16R, respectively.

A controller 30 is mounted on the vehicle 10. The controller 30 is connected to a sensor group 40 mounted on the vehicle 10 via an in-vehicle network such as Controller Area Network (CAN). The controller 30 acquires signals from the sensor group 40. The sensor group 40 includes sensors that measure physical quantities related to the behavior of the vehicle 10, such as acceleration sensor, vehicle height sensor, and wheel speed sensor. The controller 30 is also connected to the actuators 26FR, 26RR, and 26RL via the in-vehicle network.

The controller 30 includes a processor 32 and a memory 34 coupled to the processor 32. The memory 34 stores a program 36 that can be executed by the processor 32 and various information related to the program 36. The program 36 stored in the memory 34 includes a behavior control program. The behavior control described in "1-1. Behavior Control for Vehicle" is implemented by the processor 32 executing the behavior control program. The required vertical forces to be applied between the vehicle body 12 and the wheels 14FR, 14RR, and 14RL are thus given as operation signals from the controller 30 to the actuators 26FR, 26RR, and 26RL.

Figure 3:
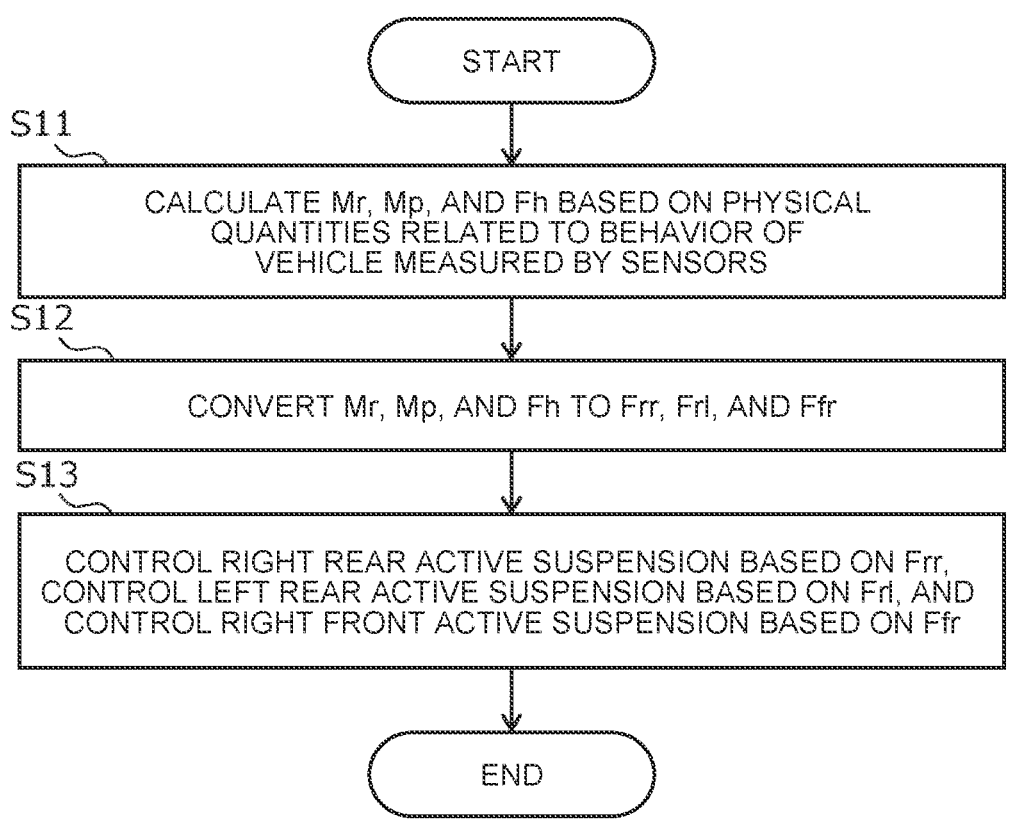
FIG. 3 is a flowchart of the behavior control for a vehicle according to the first embodiment of the present disclosure.

FIG. 3 is a flowchart of the behavior control that is performed by the controller 30 when the processor 32 executes the behavior control program. First, in step S11, the controller 30 calculates the required values of the behavior parameters from the physical quantities related to the behavior of the vehicle 10 measured by the sensor group 40. The required values of the behavior parameters that are calculated in the first embodiment are the required values of the three center-of-gravity modes, that is, the required heave force $F_h$, the required roll moment $M_r$, and the required pitch moment $M_p$.

In step S12, the controller 30 converts the required values of the three center-of-gravity modes to the required forces $F_{fr}$, $F_{rl}$, and $F_{rr}$ for the actuators 26FR, 26RL, and 26RR. Expression 4 is used for this conversion.

In step S13, the controller 30 controls the actuator 26RR of the suspension 20RRA that suspends the right rear wheel 14RR, based on the required force $F_{rr}$. At the same time, the controller 30 controls the actuator 26RL of the suspension 20RLA that suspends the left rear wheel 14RL, based on the required force $F_{rl}$. At the same time, the controller 30 also controls the actuator 26FR of the suspension 20FRA that suspends the right front wheel 14FR, based on the required force $F_{fr}$.

By performing the behavior control including the above steps by the controller 30, the desired behavior represented by the three center-of-gravity modes is implemented in the vehicle 10.

2. Second Embodiment 2-1. Behavior Control for Vehicle

Figure 4:
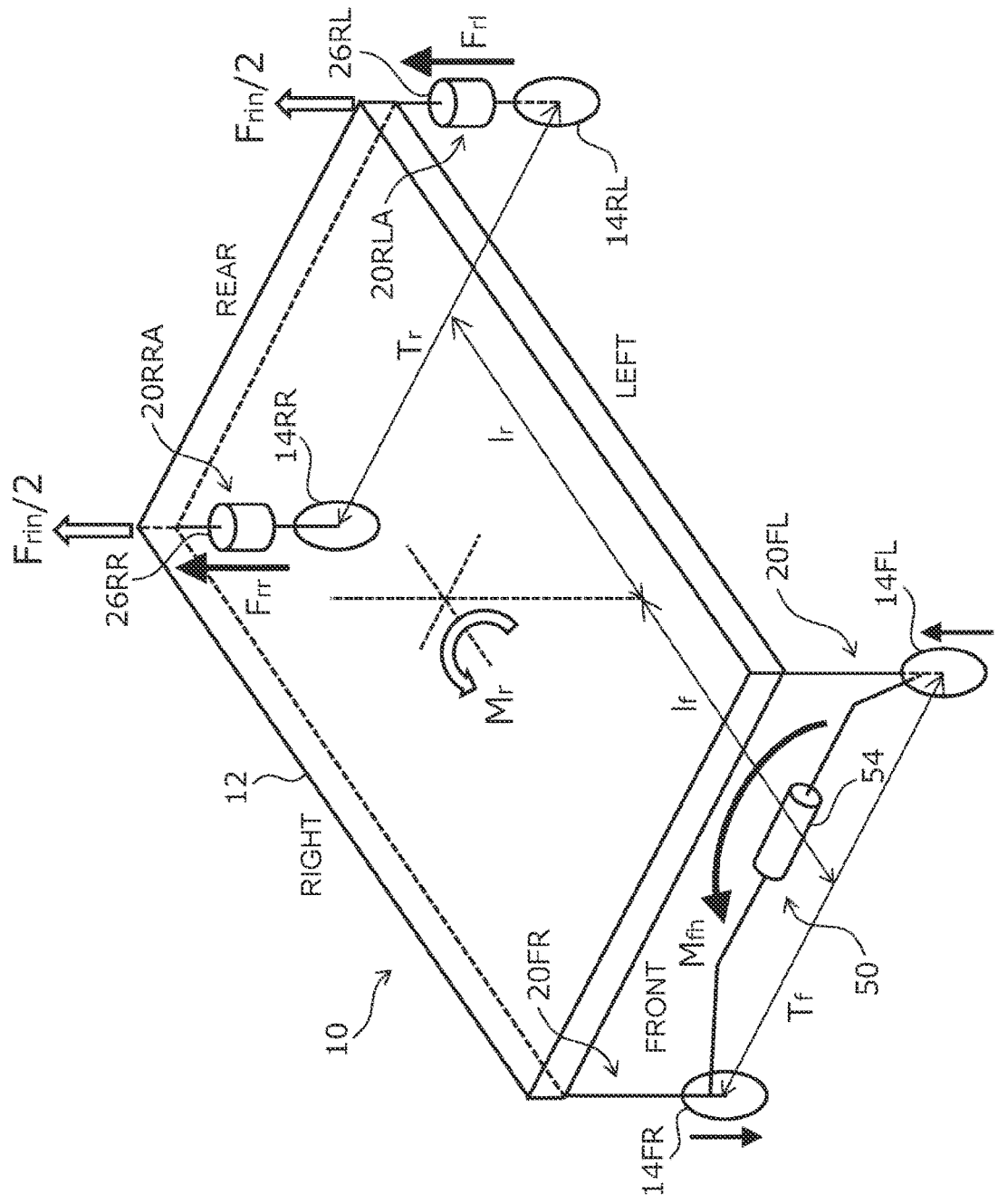
FIG. 4 shows a behavior model of a vehicle illustrating behavior control for a vehicle according to a second embodiment of the present disclosure.

Behavior control according to a second embodiment will be described with reference to FIG. 4. FIG. 4 shows a behavior model of a vehicle illustrating the behavior control according to the second embodiment. Behavior parameters to be controlled in the second embodiment and operation parameters for controlling the behavior parameters are shown in the behavior model of FIG. 4.

In the behavior model of the vehicle 10 shown in FIG. 4, the suspensions 20RRA, 20RLA that suspend the right and left wheels 14RR, 14RL on the rear axle (first axle), respectively, are configured as active suspensions. Specifically, the suspension 20RRA, 20RLA are so-called fully active suspensions that can actively apply a vertical control force between the wheels 14RR, 14RL and the vehicle body 12 by the actuators 26RR, 26RL, respectively. A suspension 20FR that suspends the right wheel 14FR on the front axle (second axle) and the suspension 20FL that suspends the left wheel 14FL on the front axle (second axle) are commonly used suspensions with no actuator, that is, non-active suspensions.

In the behavior model of the vehicle 10 shown in FIG. 4, the vehicle 10 includes an active stabilizer 50 on the front axle. The active stabilizer 50 generates a roll moment by an electric actuator 54, and can apply a vertical control force in antiphase to the right front wheel 14FR and the left front wheel 14FL so that the vertical control force balances with the roll moment. The vehicle 10 has no active stabilizer on the rear axle. However, a commonly used stabilizer with no electric actuator may be provided on the rear axle.

In the behavior control according to the second embodiment, the control force $F_{rl}$ that is applied to the left rear wheel 14RL by the actuator (first actuator) 26RL is used as an operation parameter. The control force $F_{rr}$ that is applied to the right rear wheel 14RR by the actuator (second actuator) 26RR is also used as an operation parameter. A moment $M_{fh}$ that is applied by the electric actuator 54 of the active stabilizer 50 is also used as an operation parameter.

As described in the first embodiment, in the controls related to the behavior of the vehicle 10, various forces and moments are required according to the purpose of the control. In the behavior model shown in FIG. 4, however, no degree of freedom is given in the vertical direction of the front axle. Therefore, in the behavior control according to the second embodiment, the required heave force and the required pitch moment out of the required values related to motion mode control, that is, out of the required values of the three center-of-gravity modes, are set to zero. The required front axle in-phase force is also set to zero. For simplicity, the required vertical forces to be applied to each wheel are combined into the required in-phase force or required antiphase force for the front axle or the rear axle.

By simplifying the required values of the behavior parameters as described above, the required rear axle in-phase force $F_{rin}$ and the required roll moment $M_r$ calculated by the following expression 5 are used as the required values of the behavior parameters in the behavior model shown in FIG. 4.

Expression 5

$$M_r = M_{rm} + \frac{T_f}{2}F_{fan} + \frac{T_r}{2}F_{ran} \quad \cdots 式5$$

The in-phase force acting on the rear axle (specifically, the in-phase force acting on the right and left wheels on the rear axle) may be merely damped by feedforward control or feedback control. In this case, however, vibration is reduced, but the pitch still remains. Therefore, if priority is given to reducing the pitch, control that reduces the pitch while leaving the heave may be performed. The required rear axle in-phase force in this case is defined as $F_{rin2}$.

The required rear axle in-phase force $F_{rin2}$ is calculated so that the in-phase force acting on the rear axle is cancelled by the required rear axle in-phase force $F_{rin}$ to add motion similar to the in-phase motion of the right and left wheels on the front axle to the rear axle and the entire required moment related to the control for the pitch out of the sprung feedback control is provided by the rear axle. For example, consider that the in-phase motion of the right and left wheels on the front axle is reproduced in a feedforward manner and the control for the pitch out of the sprung feedback control is added as feedback control. According to this idea, the required rear axle in-phase force $F_{rin2}$ is calculated by the following expression 6, where $Z_{lfin}$ represents the unsprung displacement due to the in-phase motion of the right and left wheels on the front axle, $K_{rin}$ represents the wheel rate for the in-phase motion of the right and left wheels on the rear axle, l (m) represents the wheelbase, v (mps) represents the vehicle speed, and $t_{dr}$ represents the total system delay of the actuators on the rear axle.

Expression 6

$$F_{rin2} = F_{rin} + M_p l_r + Z_{1fin} K_{rin} e^{-\left(\frac{l}{v} - t_{dr}\right)s} \quad \cdots 式6$$

In the behavior control according to the second embodiment, the required values of the control forces $F_{rl}$, $F_{rr}$ and moment $M_{fh}$ as operation parameters are determined so that the required values of the behavior parameters, that is, the required roll moment $M_r$ and the required rear axle in-phase force $F_{rin}$ (or $F_{rin2}$), are achieved. Specifically, the required rear axle in-phase force $F_{rin}$ (or $F_{rin2}$) needs to be equally distributed to the right and left actuators 26RR, 26RL on the rear axle 16R. The required roll moment $M_r$ can be distributed to the front and rear axles 16F, 16R at any ratio. The required moment $M_{fh}$ for the active stabilizer 50 is calculated by the following expression 7, where a represents the distribution ratio of the required roll moment $M_r$ to the front axle 16F. The required force $F_{rl}$ for the left actuator 26RL on the rear axle 16R is calculated by the following expression 8, and the required force $F_{rr}$ for the right actuator 26RR on the rear axle 16R is calculated by the following expression 9.

Expression 7

$$M_{fh} = \alpha M_r \quad \cdots 式7$$

Expression 8

$$F_{rl} = (1 - \alpha)M_r \frac{T_r}{2} + \frac{F_{rin}}{2} \quad \cdots 式8$$

Expression 9

$$F_{rr} = -(1 - \alpha)M_r \frac{T_r}{2} + \frac{F_{rin}}{2} \quad \cdots 式9$$

In the behavior control according to the second embodiment, the active stabilizer 50 is controlled so that the required moment Kb is generated by the vertical control force applied in antiphase to the right and left wheels 14FR, 14FL on the front axle 16F. At the same time, the actuator 26RL is controlled so that the vertical control force applied to the left rear wheel 14RL becomes the required force (first required force) $F_{rl}$, and the actuator 26RR is controlled so that the vertical control force applied to the right rear wheel 14RR becomes the required force (second required force) $F_{rr}$.

By performing such behavior control, the required roll moment $M_r$ and the required rear axle in-phase force $F_{rin}$ (or $F_{rin2}$) can be achieved, and the desired behavior of the vehicle 10 can be implemented. In particular, when the required rear axle in-phase force $F_{rin}$ is used as the required value of the behavior parameter, the vertical motion of the rear axle 16R is reduced, so that the comfort of the occupant(s) sitting near the rear axle 16R can be improved. On the other hand, when the required rear axle in-phase force $F_{rin2}$ is used as the required value of the behavior parameter, the pitch is cancelled while leaving the heave, so that the feeling of discomfort and unease of the occupant(s) can be reduced. The output of the active stabilizer 50 can also be prevented or restrained from becoming short of the required output by reducing the distribution ratio α to the front axle 16F and increasing the distribution ratio to the right and left actuators 26RR, 26RL on the rear axle 16R. That is, the controllable range can be increased by setting the distribution ratio α as appropriate.

2-2. Behavior Control Device for Vehicle

Figure 5:
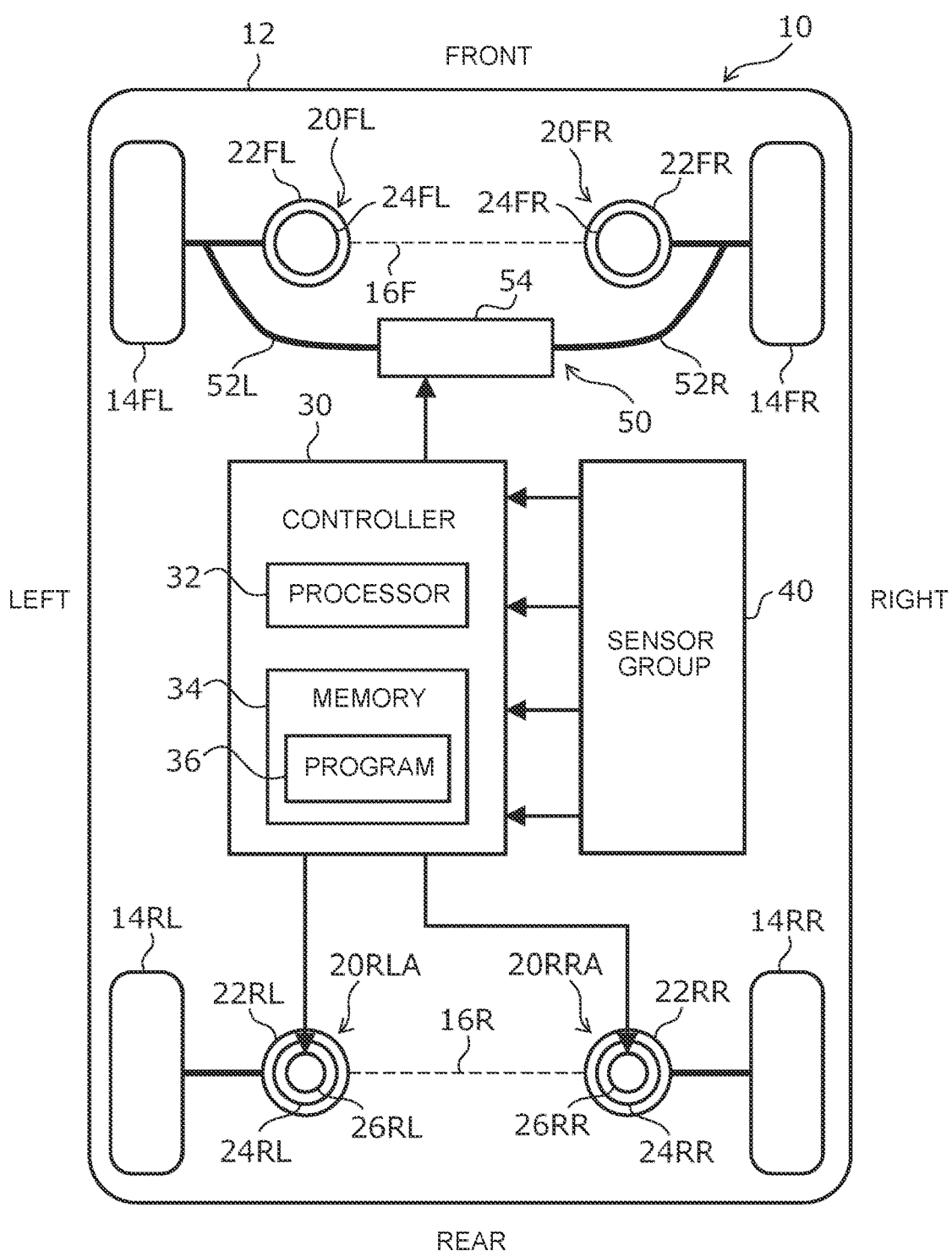
FIG. 5 shows a configuration of a vehicle equipped with a behavior control device for a vehicle according to the second embodiment of the present disclosure.

Next, a behavior control device for performing the above behavior control will be described with reference to FIG. 5. FIG. 5 shows a configuration of the vehicle 10 equipped with a behavior control device for a vehicle according to the second embodiment. In FIG. 5, the same elements as those in the first embodiment shown in FIG. 2 are denoted by the same signs as those in the first embodiment. Of the elements of the vehicle 10 shown in FIG. 5, the elements already described in the first embodiment will be described only briefly or will not be described.

As shown in FIG. 5, the vehicle 10 includes the suspension 20FL that suspends the left front wheel 14FL from the vehicle body 12, the suspension 20FR that suspends the right front wheel 14FR from the vehicle body 12, the suspension 20RLA that suspends the left rear wheel 14RL from the vehicle body 12, and the suspension 20RRA that suspends the right rear wheel 14RR from the vehicle body 12. As described above, the right and left suspensions 20RRA, 20RLA on the rear axle 16R are active suspensions (fully active suspensions), and the right and left suspensions 20FR, 20FL on the front axle 16F are non-active suspensions.

The right and left suspensions 20FR, 20FL on the front axle 16F that are non-active suspensions include the springs 22FR, 22FL and the shock absorbers 24FR, 24FL, respectively. The right and left suspensions 20RRA, 20RLA on the rear axle 16R that are active suspensions include the actuators 26RR, 26RL in addition to the springs 22RR, 22RL and the shock absorbers 24RR, 24RL, respectively. The actuators 26RR, 26RL are disposed between the vehicle body 12 and the piston rods of the shock absorbers 24RR, 24RL, respectively. The actuators 26RR, 26RL are configured to hydraulically or electromagnetically generate a vertical control force between the vehicle body 12 and the right and left rear wheels 14RR, 14RL on the rear axle 16R, respectively.

The vehicle 10 includes the active stabilizer 50 on the front axle 16F. The active stabilizer 50 includes a left stabilizer bar 52L, a right stabilizer bar 52R, and the electric actuator 54. The left stabilizer bar 52L is connected to the suspension 20FL of the left front wheel 14FL. The right stabilizer bar 52R is connected to the suspension 20FR of the right front wheel 14FR. The electric actuator 54 connects the right stabilizer bar 52R and the left stabilizer bar 52L so that the right and left stabilizer bars 52R, 52L can rotate relative to each other. The active stabilizer 50 is configured so that the electric actuator 54 causes the right stabilizer bar 52R and the left stabilizer bar 52L to rotate relative to each other to generate on the front axle 16F a roll moment in a direction corresponding to the direction of the relative rotation.

The controller 30 is connected to the actuators 26RR, 26RL and the electric actuator 54 of the active stabilizer 50 via the in-vehicle network. In the second embodiment, the behavior control described in "2-1. Behavior Control for Vehicle" is implemented by the processor 32 executing the behavior control program included in the program 36. The required vertical forces to be applied between the vehicle body 12 and the wheels 14RR, 14RL are thus given as operation signals from the controller 30 to the actuators 26RR, 26RL. The required moment to be generated on the front axle 16F is given as an operation signal from the controller 30 to the electric actuator 54.

Figure 6:
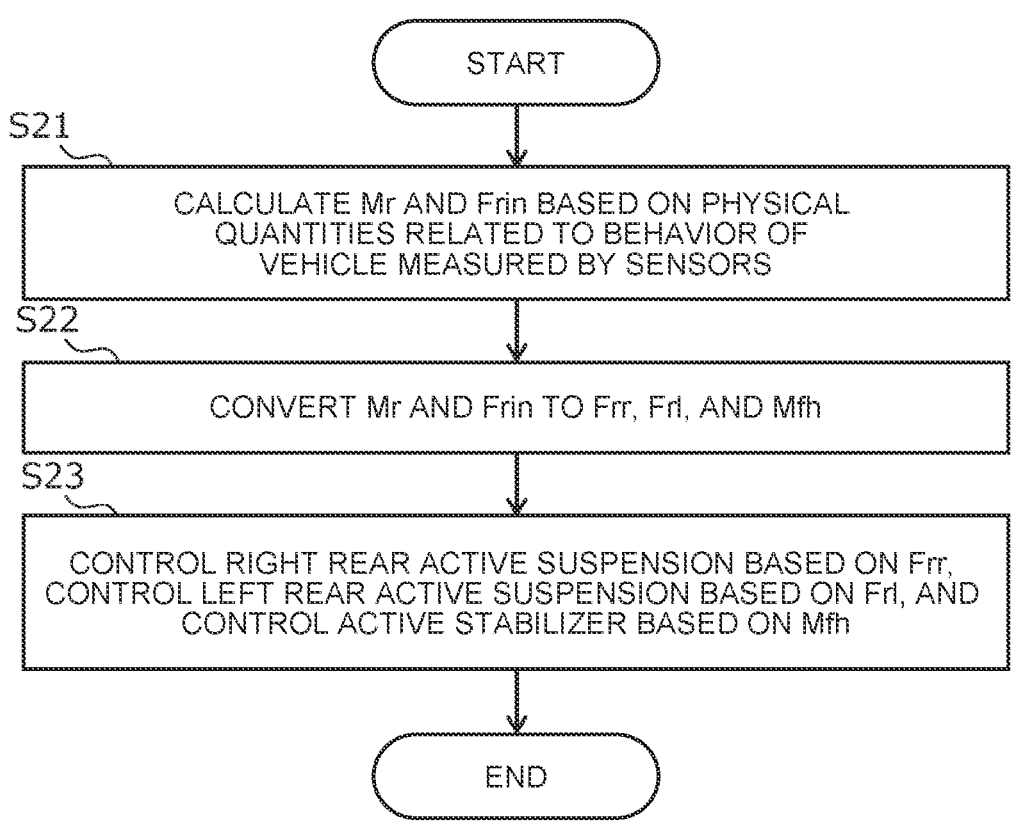
FIG. 6 is a flowchart of the behavior control for a vehicle according to the second embodiment of the present disclosure.

FIG. 6 is a flowchart of the behavior control that is performed by the controller 30 when the processor 32 executes the behavior control program. First, in step S21, the controller 30 calculates the required values of the behavior parameters from the physical quantities related to the behavior of the vehicle 10 measured by the sensor group 40. The required values of the behavior parameters that are calculated in the second embodiment are the required roll moment $M_r$ and the required rear axle in-phase force $F_{rin}$ (or $F_{rin2}$).

In step S22, the controller 30 converts the required roll moment $M_r$ and the required rear axle in-phase force $F_{rin}$ (or $F_{rin2}$) to the required forces $F_{rr}$, $F_{rl}$ for the actuators 26RR, 26RL and the required moment Kb for the active stabilizer 50. Expressions 7 to 9 are used for this conversion.

In step S23, the controller 30 controls the actuator 26RR of the right suspension 20RRA on the rear axle 16R based on the required force $F_{rr}$. At the same time, the controller 30 controls the actuator 26RL of the left suspension 20RLA on the rear axle 16R based on the required force $F_{rl}$. At the same time, the controller 30 also controls the electric actuator 54 of the active stabilizer 50 based on the required moment $M_{fh}$.

By performing the behavior control including the above steps by the controller 30, the desired behavior represented by the required roll moment $M_r$ and the required rear axle in-phase force $F_{rin}$ (or $F_{rin2}$) is implemented in the vehicle 10.

3. Third Embodiment 3-1. Behavior Control for Vehicle

Figure 7:
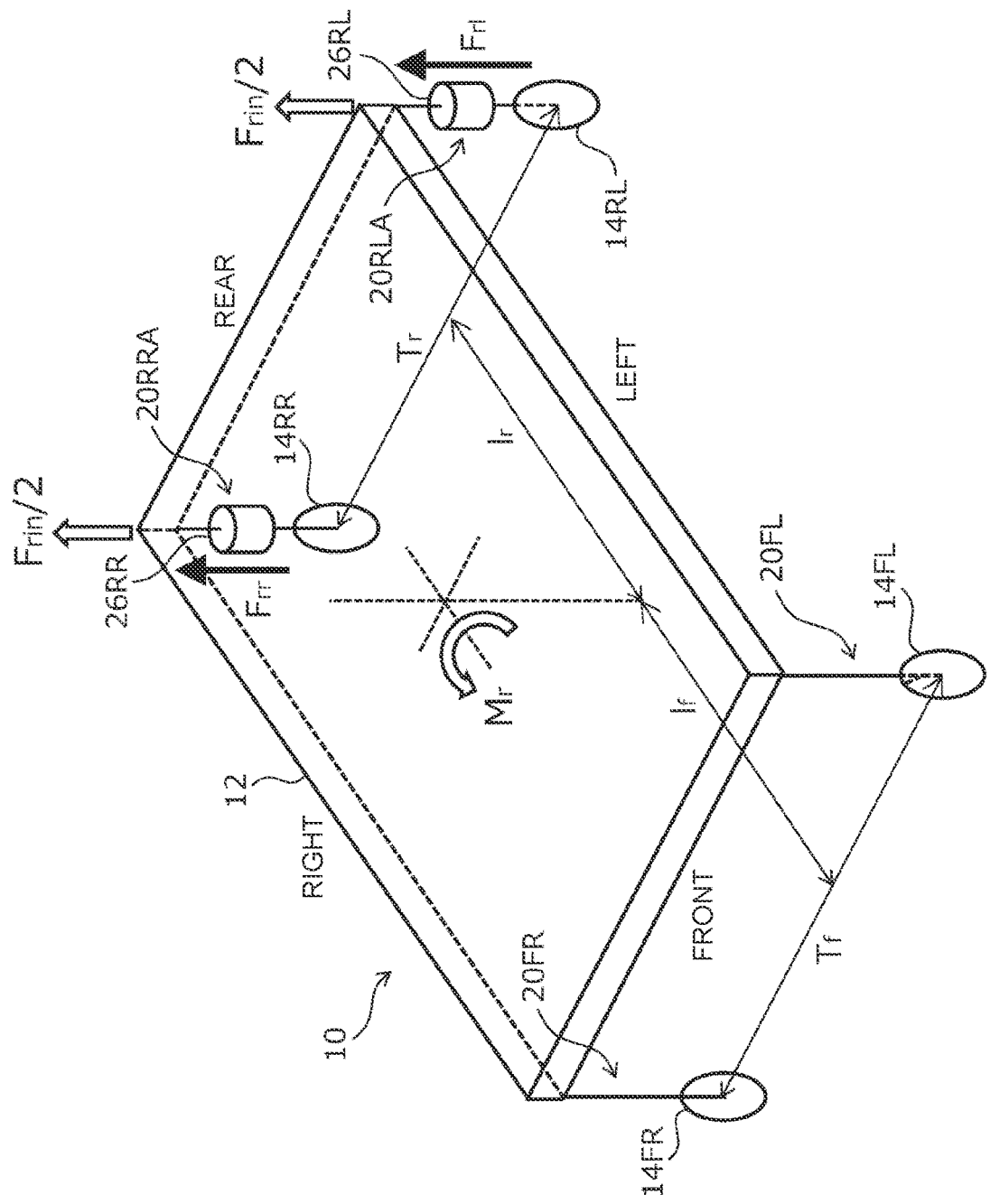
FIG. 7 shows a behavior model of a vehicle illustrating behavior control for a vehicle according to a third embodiment of the present disclosure.

Behavior control according to a third embodiment will be described with reference to FIG. 7. FIG. 7 shows a behavior model of a vehicle illustrating the behavior control according to the third embodiment. Behavior parameters to be controlled in the third embodiment and operation parameters for controlling the behavior parameters are shown in the behavior model of FIG. 7.

In the behavior model of the vehicle 10 shown in FIG. 7, the suspensions 20RRA, 20RLA that suspend the right and left wheels 14RR, 14RL on the rear axle (first axle), respectively, are configured as active suspensions. Specifically, the suspension 20RRA, 20RLA are so-called fully active suspensions that can actively apply a vertical control force between the wheels 14RR, 14RL and the vehicle body 12 by the actuators 26RR, 26RL, respectively. The suspensions 20FR, 20FL that suspend the right and left wheels 14FR, 14FL on the front axle (second axle) are commonly used suspensions with no actuator, that is, non-active suspensions.

In the behavior control according to the third embodiment, the control force $F_{rl}$ that is applied to the left rear wheel 14RL by the actuator (first actuator) 26RL is used as an operation parameter. The control force $F_{rr}$ that is applied to the right rear wheel 14RR by the actuator (second actuator) 26RR is also used as an operation parameter. That is, in the behavior control according to the third embodiment, only the vertical control forces $F_{rr}$, $F_{rl}$ that are applied to the right and left wheels 14RR, 14RL on the rear axle are used as operation parameters.

As is also described in the first embodiment, in the controls related to the behavior of the vehicle 10, various forces and moments are required according to the purpose of the control. In the behavior model shown in FIG. 7, however, no degree of freedom is given in the vertical direction of the front axle. Therefore, in the behavior control according to the third embodiment, the required heave force and the required pitch moment out of the required values related to motion mode control, that is, out of the required values of the three center-of-gravity modes, are set to zero. The required front axle in-phase force is also set to zero. For simplicity, the required vertical forces to be applied to each wheel are combined into the required in-phase force or required antiphase force for the front axle or the rear axle.

By simplifying the required values of the behavior parameters as described above, the required rear axle in-phase force $F_{rin}$ and the required roll moment $M_r$ calculated by the following expression 10 are used as the required values of the behavior parameters in the behavior model shown in FIG. 7.

Expression 10

$$M_r = M_{rm} + \frac{T_f}{2}F_{fan} + \frac{T_r}{2}F_{ran} \quad \cdots \text{式}10$$

The in-phase force acting on the rear axle (specifically, the in-phase force acting on the right and left wheels on the rear axle) may be merely damped by feedforward control or feedback control. In this case, however, vibration is reduced, but the pitch still remains. Therefore, if priority is given to reducing the pitch, control that reduces the pitch while leaving the heave may be performed. The required rear axle in-phase force in this case is defined as $F_{rin2}$.

The required rear axle in-phase force $F_{rin2}$ is calculated so that the in-phase force acting on the rear axle is cancelled by the required rear axle in-phase force $F_{rin}$ to add motion similar to the in-phase motion of the right and left wheels on the front axle to the rear axle and the entire required moment related to the control for the pitch out of the sprung feedback control is provided by the rear axle. For example, consider that the in-phase motion of the right and left wheels on the front axle is reproduced in a feedforward manner and the control for the pitch out of the sprung feedback control is added as feedback control. According to this idea, the required rear axle in-phase force $F_{rin2}$ is calculated by the following expression 11, where $Z_{1fin}$ represents the unsprung displacement due to the in-phase motion of the right and left wheels on the front axle, $K_{rin}$ represents the wheel rate for the in-phase motion of the right and left wheels on the rear axle, l (m) represents the wheelbase, v (mps) represents the vehicle speed, and $t_{dr}$ represents the total system delay of the actuators on the rear axle.

Expression 11

$$F_{rin2} = F_{rin} + M_p l_r + Z_{1fin} K_{rin} e^{-(\frac{1}{v} - t_{dr})s} \quad \cdots \text{式}11$$

In the behavior control according to the third embodiment, the required values of the control forces $F_{rl}$, $F_{rr}$ as operation parameters are determined so that the required values of the behavior parameters, that is, the required roll moment $M_r$ and the required rear axle in-phase force $F_{rin}$ (or $F_{rin2}$), are achieved. Specifically, the required rear axle in-phase force $F_{rin}$ (or $F_{rin2}$) needs to be equally distributed to the right and left actuators 26RR, 26RL on the rear axle 16R. The required roll moment $M_r$ needs to be fully distributed to the rear axle 16R. Based on these conditions, the required force $F_{rl}$ for the left actuator 26RL on the rear axle 16R is calculated by the following expression 12, and the required force $F_{rr}$ for the right actuator 26RR on the rear axle 16R is calculated by the following expression 13.

Expression 12

$$F_{rl} = M_r \frac{T_r}{2} + \frac{F_{rin}}{2} \quad \cdots \text{式}12$$

Expression 13

$$F_{rr} = -M_r \frac{T_r}{2} + \frac{F_{ris}}{2} \quad \cdots \text{式}13$$

In the behavior control according to the third embodiment, the actuator 26RL is controlled so that the vertical control force applied to the left rear wheel 14RL becomes the required force (first required force) $F_{rl}$, and the actuator 26RR is controlled so that the vertical control force applied to the right rear wheel 14RR becomes the required force (second required force) $F_{rr}$.

By performing such behavior control, the required roll moment $M_r$ and the required rear axle in-phase force $F_{rin}$ (or $F_{rin2}$) can be achieved, and the desired behavior of the vehicle 10 can be implemented. In particular, when the required rear axle in-phase force $F_{rin}$ is used as the required value of the behavior parameter, the vertical motion of the rear axle 16R is reduced, so that the comfort of the occupant(s) sitting near the rear axle 16R can be improved. On the other hand, when the required rear axle in-phase force $F_{rin2}$ is used as the required value of the behavior parameter, the pitch is cancelled while leaving the heave, so that the feeling of discomfort and unease of the occupant(s) can be reduced.

3-2. Behavior Control Device for Vehicle

Figure 8:
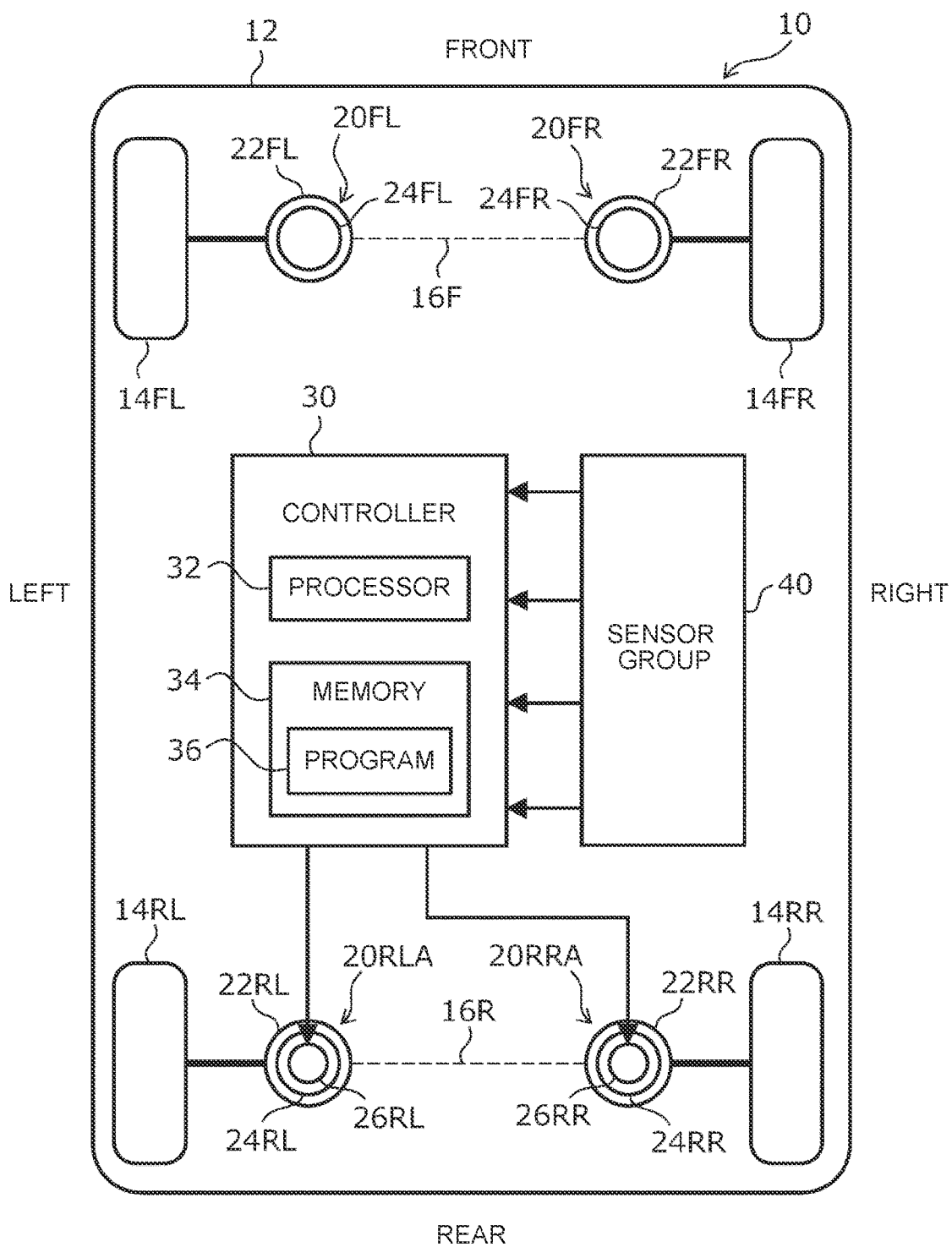
FIG. 8 shows a configuration of a vehicle equipped with a behavior control device for a vehicle according to the third embodiment of the present disclosure.

Next, a behavior control device for performing the above behavior control will be described with reference to FIG. 8. FIG. 8 shows a configuration of the vehicle 10 equipped with a behavior control device for a vehicle according to the third embodiment. In FIG. 8, the same elements as those in the first embodiment shown in FIG. 2 are denoted by the same signs as those in the first embodiment. Of the elements of the vehicle 10 shown in FIG. 8, the elements already described in the first embodiment will be described only briefly or will not be described.

As shown in FIG. 8, the vehicle 10 includes the suspension 20FL that suspends the left front wheel 14FL from the vehicle body 12, the suspension 20FR that suspends the right front wheel 14FR from the vehicle body 12, the suspension 20RLA that suspends the left rear wheel 14RL from the vehicle body 12, and the suspension 20RRA that suspends the right rear wheel 14RR from the vehicle body 12. As described above, the right and left suspensions 20RRA, 20RLA on the rear axle 16R are active suspensions (fully active suspensions), and the right and left suspensions 20FR, 20FL on the front axle 16F are non-active suspensions.

The right and left suspensions 20FR, 20FL on the front axle 16F that are non-active suspensions include the springs 22FR, 22FL and the shock absorbers 24FR, 24FL, respectively. The right and left suspensions 20RRA, 20RLA on the rear axle 16R that are active suspensions include the actuators 26RR, 26RL in addition to the springs 22RR, 22RL and the shock absorbers 24RR, 24RL, respectively. The actuators 26RR, 26RL are disposed between the vehicle body 12 and the piston rods of the shock absorbers 24RR, 24RL, respectively. The actuators 26RR, 26RL are configured to hydraulically or electromagnetically generate a vertical control force between the vehicle body 12 and the right and left rear wheels 14RR, 14RL on the rear axle 16R, respectively.

The controller 30 is connected to the actuators 26RR, 26RL via the in-vehicle network. In the third embodiment, the behavior control described in "3-1. Behavior Control for Vehicle" is implemented by the processor 32 executing the behavior control program included in the program 36. The required vertical forces to be applied between the vehicle body 12 and the wheels 14RR, 14RL are thus given as operation signals from the controller 30 to the actuators 26RR, 26RL.

Figure 9:
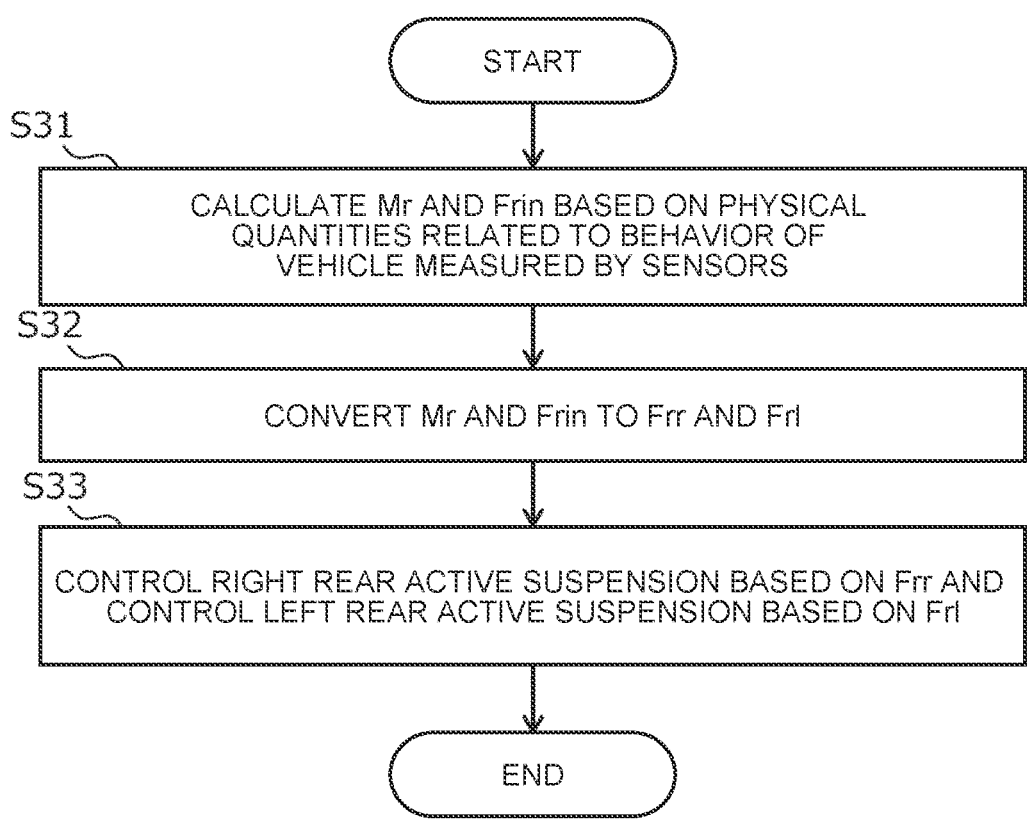
FIG. 9 is a flowchart of the behavior control for a vehicle according to the third embodiment of the present disclosure.

FIG. 9 is a flowchart of the behavior control that is performed by the controller 30 when the processor 32 executes the behavior control program. First, in step S31, the controller 30 calculates the required values of the behavior parameters from the physical quantities related to the behavior of the vehicle 10 measured by the sensor group 40. The required values of the behavior parameters that are calculated in the third embodiment are the required roll moment $M_r$ and the required rear axle in-phase force $F_{rin}$ (or $F_{rin2}$).

In step S32, the controller 30 converts the required roll moment $M_r$ and the required rear axle in-phase force $F_{rin}$ (or $F_{rin2}$) to the required forces $F_{rr}$, $F_{rl}$ for the actuators 26RR, 26RL. Expressions 12, 13 are used for this conversion.

In step S33, the controller 30 controls the actuator 26RR of the right suspension 20RRA on the rear axle 16R based on the required force $F_{rr}$. At the same time, the controller 30 controls the actuator 26RL of the left suspension 20RLA on the rear axle 16R based on the required force $F_{rl}$.

By performing the behavior control including the above steps by the controller 30, the desired behavior represented by the required roll moment $M_r$ and the required rear axle in-phase force $F_{rin}$ (or $F_{rin2}$) is implemented in the vehicle 10.

4. Fourth Embodiment

Figure 10:
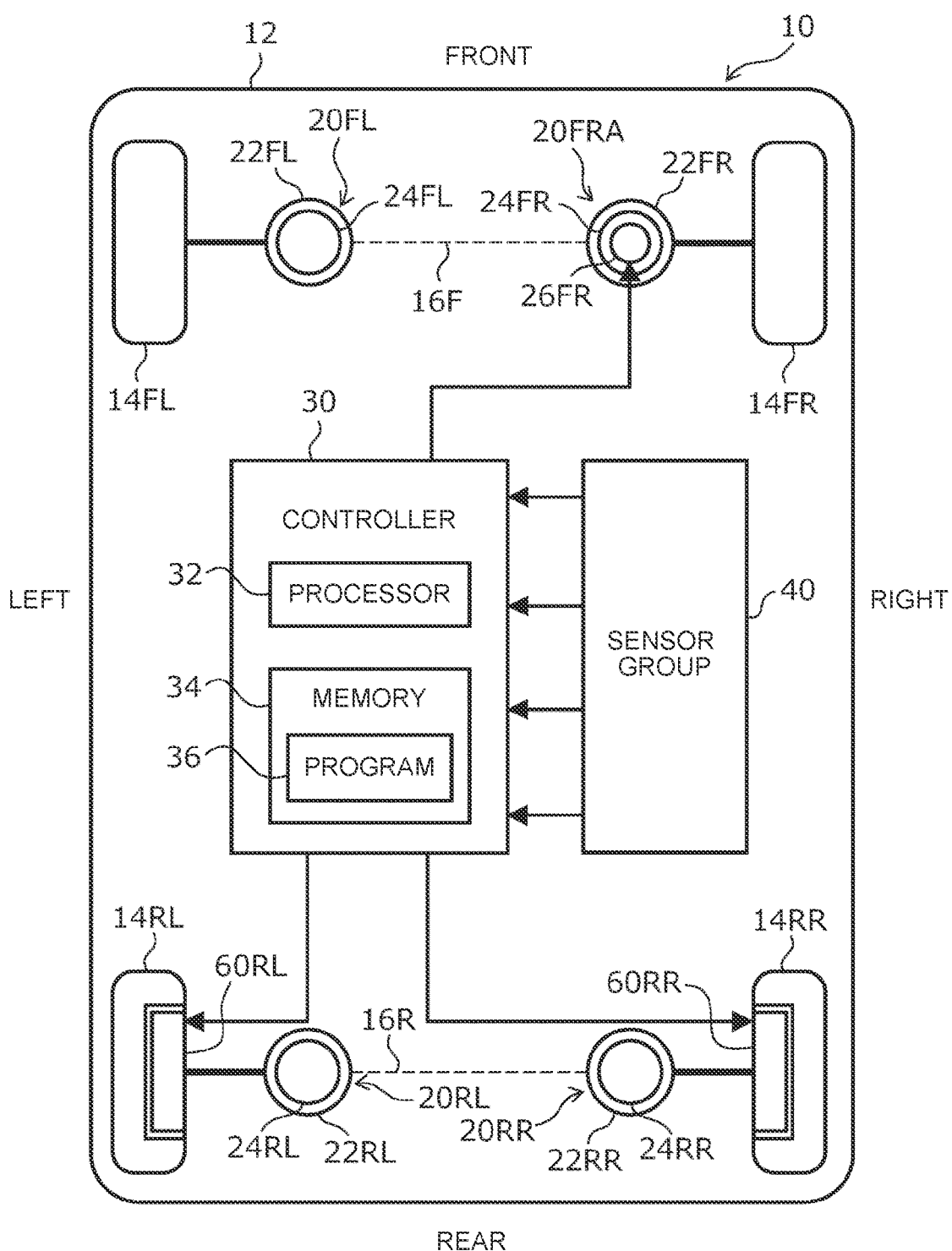
FIG. 10 shows a configuration of a vehicle equipped with a behavior control device for a vehicle according to a fourth embodiment of the present disclosure.

FIG. 10 shows a configuration of a vehicle equipped with a behavior control device for a vehicle according to a fourth embodiment of the present disclosure. In FIG. 10, the same elements as those in the first embodiment shown in FIG. 2 are denoted by the same signs as those in the first embodiment. Of the elements of the vehicle 10 shown in FIG. 10, the elements already described in the first embodiment will be described only briefly or will not be described.

As shown in FIG. 10, the vehicle 10 includes the suspension 20FL that suspends the left front wheel 14FL from the vehicle body 12, the suspension 20FRA that suspends the right front wheel 14FR from the vehicle body 12, a suspension 20RL that suspends the left rear wheel 14RL from the vehicle body 12, and a suspension 20RR that suspends the right rear wheel 14RR from the vehicle body 12. In the fourth embodiment, only the right suspension 20FRA on the front axle 16F is an active suspensions (fully active suspensions), and the other suspensions 20FL, 20RL, and 20RR are non-active suspensions.

The left suspension 20FL on the front axle 16F and the suspensions 20RL, 20RR on the rear axle 16R that are non-active suspensions include the springs 22FL, 22RL, and 22RR and shock absorbers 24FL, 24RL, and 24RR, respectively. The right suspension 20FRA on the front axle 16F that is an active suspension includes the actuator 26FR in addition to the spring 22FR and the shock absorber 24FR. The actuator 26FR is disposed between the vehicle body 12 and the piston rod of the shock absorber 24FR. The actuator 26FR is configured to hydraulically or electromagnetically generate a vertical control force between the vehicle body 12 and the right front wheel 14FR.

In the fourth embodiment, the vehicle 10 includes in-wheel motors 60RR, 60RL in the right and left wheels 14RR, 14RL on the rear axle 16R, respectively. For example, the in-wheel motors 60RR, 60RL may be direct-drive in-wheel motors or may be gear reduction in-wheel motors. Due to the geometry of the suspension 20RL, a vertical control force that is applied between the left rear wheel 14RL and the vehicle body 12 is generated from the braking force or driving force applied to the left rear wheel 14RL by the in-wheel motor 60RL. That is, the in-wheel motor 60RL operates as a first actuator that applies a vertical control force to the left rear wheel 14RL. Due to the geometry of the suspension 20RR, a vertical control force that is applied between the right rear wheel 14RR and the vehicle body 12 is generated from the braking force or driving force applied to the right rear wheel 14RR by the in-wheel motor 60RR. That is, the in-wheel motor 60RR operates as a second actuator that applies a vertical control force to the right rear wheel 14RR.

In the behavior control according to the fourth embodiment, the vertical control forces that are applied by the right and left in-wheel motors 60RR, 60RL on the rear axle 16R and the vertical control force that is applied by the right actuator 26FR on the front axle 16F can be used as operation parameters. Since these three vertical control forces can be controlled independently, all of the roll, pitch, and heave of the vehicle 10 can be controlled as in the behavior control device according to the first embodiment. In the behavior control according to the fourth embodiment, the above three control forces are determined so that the required values of the three center-of-gravity modes, namely the required roll moment $M_r$, the required pitch moment $M_p$, and the required heave force $F_h$, are achieved.

The controller 30 is connected to the in-wheel motors 60RR, 60RL and the actuator 26FR via the in-vehicle network. The required vertical forces to be applied between the vehicle body 12 and the right and left wheels 14RR, 14RL on the rear axle 16R are given as operation signals from the controller 30 to the in-wheel motors 60RR, 60RL. The required vertical force to be applied between the vehicle body 12 and the right wheel 14FR on the front axle 16F is given as an operation signal from the controller 30 to the actuator 26FR. In the behavior control according to the fourth embodiment, the control of the three center-of-gravity modes using the in-wheel motors 60RR, 60RL and the actuator 26FR is implemented by the processor 32 executing the behavior control program included in the program 36.

5. Other Embodiments

In the first embodiment, the left suspension instead of the right suspension on the front axle 16F may be an active suspension. Alternatively, the right and left suspensions on the front axle 16F may be active suspensions, and one of the suspensions on the rear axle 16R may be an active suspension.

In the second embodiment, the right and left suspensions on the front axle 16F may be active suspensions, the right and left suspensions on the rear axle 16R may be non-active suspensions, and an active stabilizer may be provided on the rear axle 16R. However, the configuration in which the right and left suspensions on the rear axle 16R are active suspensions is more useful in terms of the comfort of a rear seat occupant(s), and is also useful in that the preview control is possible.

In the third embodiment, the right and left suspensions on the front axle 16F may be active suspensions, and the right and left suspensions on the rear axle 16R may be non-active suspensions. However, the configuration in which the right and left suspensions on the rear axle 16R are active suspensions is more useful in terms of the comfort of a rear seat occupant(s), and is also useful in that the preview control is possible. In some embodiments, the configuration in which the right and left suspensions on the rear axle 16R are active suspensions is also useful in terms of mountability and heat damage.

In the second and third embodiments, the suspensions 20RRA, 20RLA on the rear axle 16R may be non-active suspensions, and the in-wheel motors 60RL, 60RR as in the fourth embodiment may be provided on the rear axle 16R.

The active suspensions mounted on the vehicle 10 in the first to fourth embodiments may be so-called semi-active suspensions that generate a vertical control force by using a variable spring coefficient and a variable damping force coefficient. In the first embodiment, the suspension 20FRA on the front axle 16F may be a fully active suspension, and the suspensions 20RRA, 20RLA on the rear axle 16R may be semi-active suspensions. Alternatively, the suspension 20FRA on the front axle 16F may be a semi-active suspension, and the suspensions 20RRA, 20RLA on the rear axle 16R may be fully active suspensions.

What is claimed is:

1. A behavior control device for a vehicle, the behavior control device comprising:
    a first actuator configured to apply a vertical control force to a left wheel on a first axle, the first axle being a front axle or a rear axle of the vehicle;
    a second actuator configured to
        operate independently of the first actuator, and
        apply a vertical control force to a right wheel on the first axle;
    an active stabilizer configured to apply a vertical control force in antiphase to a right wheel and left wheel on a second axle, the second axle being the front axle or the rear axle; and
    a controller configured to:
        calculate a required value of a behavior parameter representing a behavior of the vehicle,
        calculate a required roll moment and a required in-phase vertical force as the required value of the behavior parameter, the required roll moment being a moment to be applied to a center of gravity of the vehicle, and the required in-phase vertical force being a force to be applied to the right wheel and the left wheel on the first axle;
        convert the required value of the behavior parameter to the first required force for the first actuator, the second required force for the second actuator, and a required moment for the active stabilizer,
        control the first actuator such that the vertical control force applied to the left wheel on the first axle becomes the first required force, and
        control the second actuator such that the vertical control force applied to the right wheel on the first axle becomes the second required force; and
    control the active stabilizer such that the required moment is generated by the vertical control force applied in antiphase to the right wheel and the left wheel on the second axle.

* * * * *